Patented Dec. 1, 1936

2,062,387

UNITED STATES PATENT OFFICE 2,062,387

PROCESS FOR THE ALTERATION OF EGG WHITE

Arnold K. Balls, Washington, D. C., and Theodore L. Swenson, Chevy Chase, Md., dedicated to the free use of the Public in the territory of the United States of America No Drawing. Original application March 6, 1934, Serial No. 714,277. Divided and this application July 21, 1936, Serial No. 91,718

2 Claims. (Cl. 99—210)

(Granted under the act of March 3, 1883, as amended April 30, 1928; 370 O. G. 757)

This application is a division of our application for patent which bears Serial No. 714,277, filed March 6, 1934, patented September 15, 1936, Patent No. 2,054,213, covering a process for the alteration of egg white.

This application is made under the act of March 3, 1883, as amended by the act of April 30, 1928, and the invention herein described, if patented, may be manufactured and used by or for the Government for governmental purposes without the payment to us of any royalty thereon.

We hereby dedicate the invention herein described to the free use of the public in the territory of the United States of America to take effect upon the granting of a patent to us.

This invention relates to the alteration of thick egg white to thin egg white. The whites of birds' eggs when fresh consist of a thin, easily fluid portion, and a thick and viscid portion. These portions may be more or less separated by a coarse screen, which retains the thick white, and allows the thin white to flow through. In the normal process of storing eggs the thin white increases in amount while the thick white decreases.

In certain industries, however, the thin white is more desirable than the thick white. This is true of the industry of drying egg white, where it is known that the thin white dries more readily, is more easily handled in the drier, and gives a more desirable product, in that it is more completely soluble in water than the dried whole white. In the industry it is customary to allow the whole egg white to stand for several days before drying it, in order that the change from thick to thin white may first take place.

We have found that the change from thick to thin white is a proteolysis, whereby mucin and probably other proteins of the egg are partly hydrolyzed by the proteolytic ferments which occur normally in eggs. We have found that one ferment which is responsible for the hydrolysis of thick white is trypsin. The tryptic action does not progress without limit, however, because there is present in thin white an inhibitory substance which retards the breakdown of the protein.

We have further found that the trypsin present in normal egg white is largely in an inactive or an inhibited condition, and for this reason the natural breakdown of the thick white proceeds slowly.

It is desirable sometimes, for instance in the industry of manufacturing dried egg products, to accelerate the speed of the breakdown from thick to thin white. We have found that this may be accomplished by activating the trypsin already present in the egg white. To this end any preparation containing enterokinase may be mixed with the egg white. We have used enterokinase prepared from the intestines of pigs by the published methods.

In order to properly gauge the amount of enterokinase to be added, one should take into account the amount of inhibitor occurring naturally in the egg whites, the temperature at which they will be kept for digestion, and the time in which the digestion shall take place. By increasing the temperature or the amount of kinase, the digestion is accelerated. At temperatures below 25° C. the digestion is slow, at temperatures above 40° C. there is danger of destroying the trypsin, at temperatures above 55° C. there is danger of coagulating the egg proteins. Temperatures between 30° and 40° C. are recommended. Occasional or very slow agitation is of advantage.

Under these conditions we have found that for most egg whites the amount of enterokinase usually present in one part by weight of the dried intestinal mucosa of the pig is sufficient to activate the trypsin of two thousand parts of whole egg white to the extent that the thick white is practically all digested in one day or less. (It is usually advisable to screen out or otherwise separate particles of undigested membranes from the digested mixture.)

Both material and time may be saved, however, by first separating the thin from the thick egg white, and treating only the latter with the kinase. This method usually requires less than half the kinase needed for the entire egg white, because much of the tryptic inhibitor has been removed in the thin white.

We have also found that it is possible to substitute certain chemicals for the enterokinase in the above process, such substances being benzoyl derivatives of the amino acids and peptides. We particularly recommend benzoyl glycine for this purpose, and use it in place of enterokinase in the amount of one part of benzoyl glycine to five thousand parts of egg white by weight, but it is understood that this amount may vary with the eggs.

While it is possible to use the activators here described in the form of solid preparations, it is more convenient to use a solution in water, containing in the case of water insoluble preparations, enough alkali to dissolve them.

Having fully disclosed our invention, we claim:

1. The process of thinning egg white which comprises mixing benzoyl-glycine with the egg white at a temperature not exceeding 40° C.

2. In the process of manufacturing dried egg white the step of mixing benzoyl-glycine with the egg white at a temperature not exceeding 40° C.

ARNOLD K. BALLS.
THEODORE L. SWENSON.